United States Patent
Sidler

(10) Patent No.: US 8,365,760 B2
(45) Date of Patent: Feb. 5, 2013

(54) SLIDE VALVE WITH TEMPERATURE BARRIER

(75) Inventor: Hans-Jorg Sidler, Eschenbach (CH)

(73) Assignee: SISTAG AG Absperrtechnik, Eschenbach (CH)

( * ) Notice: Subject to any disclaimer, the term of this patent is extended or adjusted under 35 U.S.C. 154(b) by 229 days.

(21) Appl. No.: 12/819,538

(22) Filed: Jun. 21, 2010

(65) Prior Publication Data

US 2011/0001076 A1    Jan. 6, 2011

(30) Foreign Application Priority Data

Jul. 2, 2009   (CH) ..................................... 1035/09

(51) Int. Cl.
*F16K 3/02*   (2006.01)

(52) U.S. Cl. ........ 137/375; 251/329; 251/332; 251/367; 251/368

(58) Field of Classification Search .......... 251/326–329, 251/367–368, 332; 137/375
See application file for complete search history.

(56) References Cited

U.S. PATENT DOCUMENTS

| | | | | |
|---|---|---|---|---|
| 2,497,780 A | * | 2/1950 | Lawson | 137/375 |
| 3,906,992 A | * | 9/1975 | Leach | 137/315.32 |
| 3,917,223 A | * | 11/1975 | Sidler et al. | 251/214 |
| 4,112,969 A | * | 9/1978 | Still | 137/454.2 |
| 4,206,905 A | * | 6/1980 | Dobler | 251/328 |
| 4,275,763 A | * | 6/1981 | Fahrig | 137/375 |
| 5,150,881 A | * | 9/1992 | McKavanagh | 251/327 |
| 5,549,278 A | * | 8/1996 | Sidler | 251/328 |
| 6,203,890 B1 | * | 3/2001 | Imamura et al. | 428/32.52 |
| 6,935,618 B2 | * | 8/2005 | Welty et al. | 251/368 |
| 7,350,766 B2 | * | 4/2008 | Comstock et al. | 251/328 |
| 2007/0163655 A1 | * | 7/2007 | Hunter | 137/375 |

FOREIGN PATENT DOCUMENTS

WO   WO 2009020555 A2 *   2/2009

OTHER PUBLICATIONS

U.S. Appl. No. 12/700,156, filed on Feb. 4, 2010.
U.S. Appl. No. 12/748,551, filed on Mar. 29, 2010.

\* cited by examiner

*Primary Examiner* — John Bastianelli
(74) *Attorney, Agent, or Firm* — Brian Roffe

(57) ABSTRACT

A slide valve for blocking a line conveying media includes a housing having a passage opening and a slider plate moveable within the housing at right angles to the passage opening. The slider plate can be displaced from an open position into a closed position blocking the passage opening tightly by a drive mechanism. A lateral seal is disposed in a respective groove in the housing above the passage opening on both sides of the slider plate at right angles to its direction of displacement. The inside and outside of the housing and the slider plate are provided with at least one layer forming a temperature barrier, and the lateral seal includes a high temperature-resistant layer or sealing compound. The risk of a leak into the atmosphere and/or in the passage during a fire or during extinguishing efforts is thus substantially reduced.

20 Claims, 3 Drawing Sheets

SLIDE VALVE WITH TEMPERATURE BARRIER

FIELD OF THE INVENTION

The invention relates to a slide valve, in particular for blocking a line conveying media, that includes a housing having a passage opening and a slider plate moveable within the housing at right angles to the passage opening and which can be displaced from an open position into a closed position blocking the passage opening tightly by means of a drive mechanism. The slide valve also includes lateral seals disposed in grooves in the housing above the passage opening on both sides of the slider plate at right angles to its direction of displacement.

BACKGROUND OF THE INVENTION

Slide valves of this type are known, and are used, for example, in the chemicals or food industry for blocking lines for a wide variety of media where the latter can be liquid or gaseous materials and also solids, for example fuels, chemical liquids, granules, cereals etc. The slide valves are respectively provided with a housing having a passage opening and with a slider plate moveable within the housing at right angles to the passage opening and which can be displaced from an open position into a closed position blocking the passage opening tightly by means of a drive mechanism. A lateral seal is respectively disposed in a respective groove in the housing above the passage opening on both sides of the slider plate at right angles to its direction of displacement. The slide valves must meet high criteria with regard to fire safety, in particular when being used in areas where there is a risk of fire—both internally and externally.

OBJECTS AND SUMMARY OF THE INVENTION

The object forming the basis of the present invention is to provide a slide valve of the type specified at the start which meets the stringent requirements with regard to fire safety.

This object is achieved according to the invention by a slide valve wherein the inside and outside of a housing of the slide valve as well as a slider plate in the slide valve are provided with at least one layer forming a temperature barrier.

Further preferred embodiments of the slide valve according to the invention form the subject matter of the dependent claims.

Since according to the invention the inside and outside of the housing as well as the slider plate are provided with at least one layer forming a temperature barrier, and the lateral seal comprises a high temperature-resistant layer or sealing compound, the risk of a leak into the atmosphere and/or within the passage during a fire or during extinguishing efforts is substantially reduced.

BRIEF DESCRIPTION OF THE DRAWINGS

In the following the invention is described in greater detail by means of the drawings. These show as follows.

DETAILED DESCRIPTION OF THE INVENTION

Figure 1:
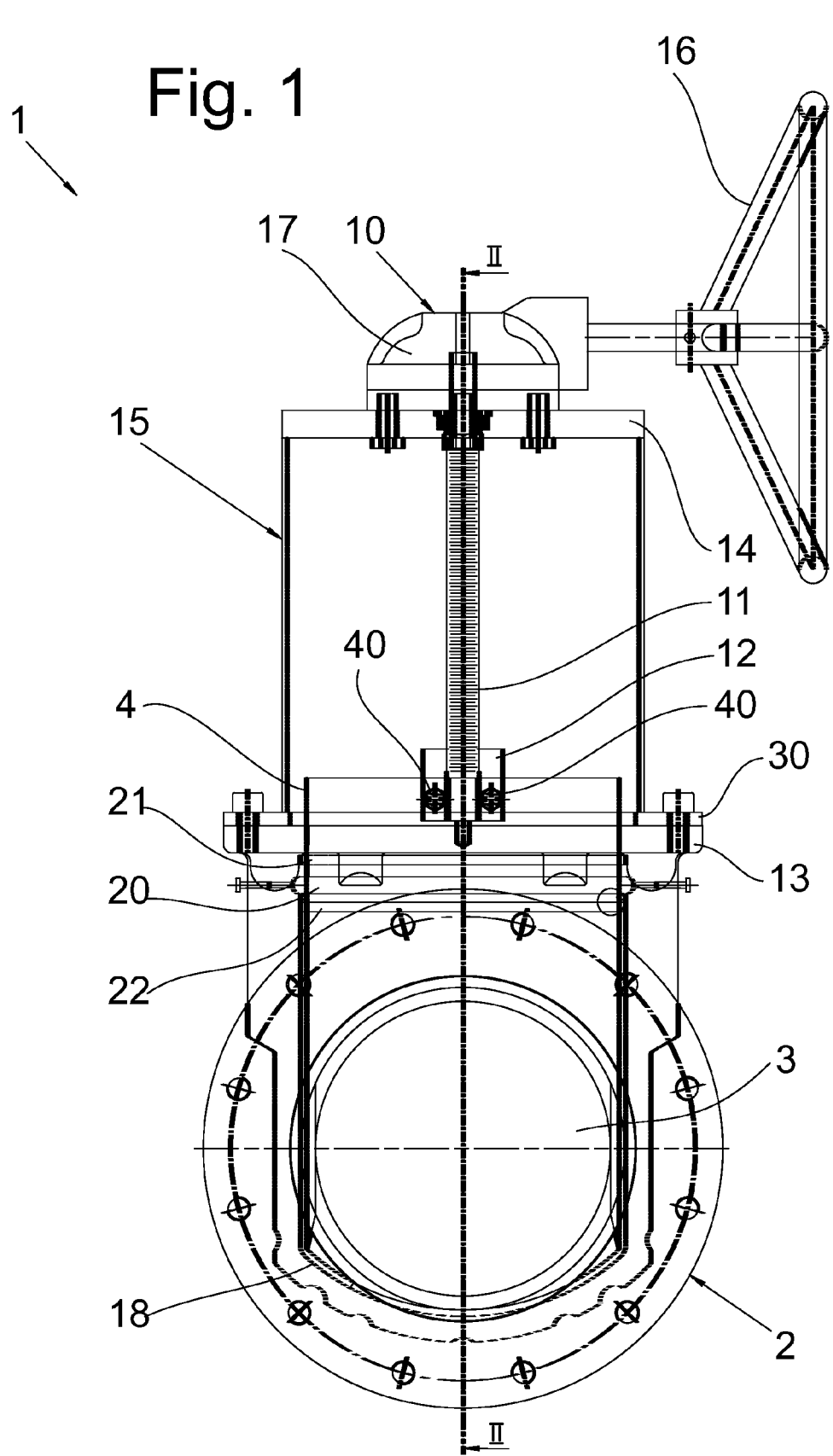
FIG. 1 is a front view of an exemplary embodiment of a slide valve according to the invention.
Figure 2:
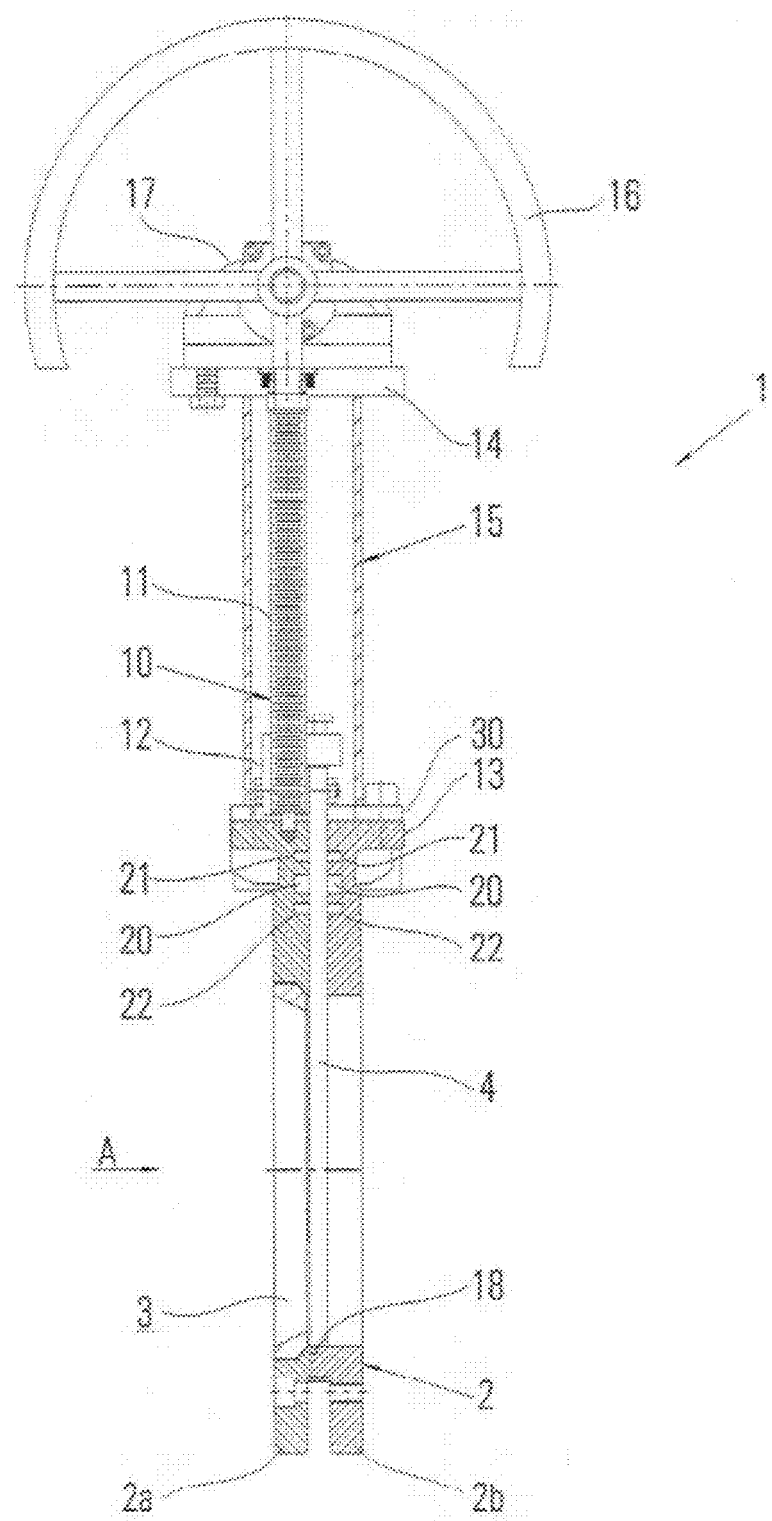
FIG. 2 is a section along line II-II in FIG. 1.

In FIG. 1 and FIG. 2, a slide valve 1 is illustrated which is particularly suitable for blocking a line conveying media, the media possibly being liquid or gaseous materials or also solids, for example fuels, chemical liquids, granules, cereals and many others.

The slide valve 1 has a housing 2 provided with a passage opening 3 and comprising two housing parts 2a, 2b in which a slider plate 4 is mounted moveably at right angles to the passage opening 3 or to the main direction of flow A according to FIG. 2. The slider plate 4 can be displaced from an open position into a closed position blocking the passage opening 3 tightly by means of a drive mechanism 10. According to FIGS. 1 and 2 the slider plate 4 is in the closed position.

The drive mechanism 10 comprises a drive spindle 11 with a spindle nut 12 displaceable on the latter and which is connected to the slider plate 4, as will be described in greater detail below by means of FIG. 4. The drive spindle 11 is mounted rotatably on the one hand in an upper structural flange 13 of the housing 2, and on the other hand in a covering part 14 of a closed hood 15 placed onto the structural flange 13. The drive spindle 11 is allowed rotational movement by a manually operable drive wheel 16 via a bevel gear 17 (for example with a 3:1 transmission ratio) which brings about the displacement of the spindle nut 12 and so also the displacement of the slider plate 4.

In principle, however, a drive can also be provided which moves the spindle nut 12 or a tension or piston rod. The bevel gear 17 or some other drive is accommodated in a closed housing screwed together with the covering part 14 of the hood 15.

In order to prevent the medium from being able to run out between the two flat housing parts 2a, 2b and the slider plate 4 located between the latter on the one hand a rope seal 18 is placed around the passage opening 3 in the housing 2, and on the other hand oblong lateral seals 20, 21, 22 are disposed in corresponding grooves in the housing 2 above the passage opening 3 on both sides of the slider plate 4 at right angles to their direction of displacement. In a particularly preferred way, not just one lateral seal is provided here respectively on both sides of the slider plate 4, but three respective lateral seals 20, 21, 22 are disposed in three respective grooves 20', 21', 22', as can be seen in particular in FIG. 3 and as is described in greater detail below.

So that in the event of a fire—whether caused from the inside, spreading over the line, or caused from the outside—the slide valve 1 bears up, and leaks into the atmosphere and/or in the passage are avoided as far as possible both during the fire and during extinguishing efforts, the following steps are taken according to the invention.

Firstly, both the inside and the outside of the housing 2 and the slider plate 4 are provided with a coating forming a temperature barrier. The housing coating preferably comprises three layers, namely an adhesive undercoat, preferably a chemically resistant and high temperature-resistant coat which can be over-coated with catalytic epoxy, a tumescent coat, preferably a catalytic two-component epoxy layer which, as a fire barrier, forms a tumescent, isolating layer at high temperatures, and so forms a first temperature barrier, and a top PTFE layer with a low friction coefficient, preferably a high temperature-resistant mixture of barium sulphates and silicones which forms a second temperature barrier and has good slide properties.

The slider plate 4 is also coated with a PTFE layer with a low friction coefficient, preferably a high temperature-resistance mixture of barium sulphates and silicones.

The inside plate guide region of the housing 2 in particular (and the slider plate 4 itself) is given a precise finish so that unimpeded plate movement is guaranteed.

Figure 3:
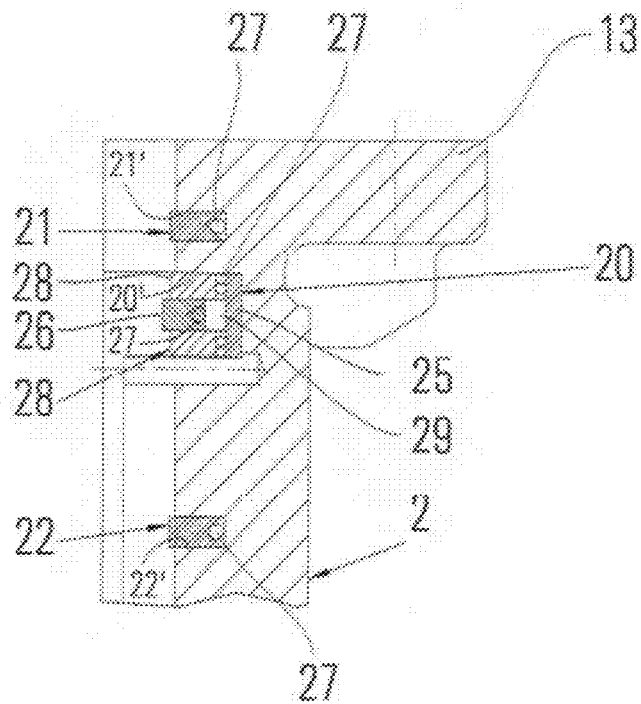
FIG. 3 is a part of FIG. 2 in an enlarged scale.

Furthermore, the middle of the aforementioned three lateral seals 20, 21, 22 disposed on both sides of the slider plate 4 according to FIG. 3 are in the form of sealing packing which comprises a sealing layer 25 made of temperature-resistant woven graphite yarn. The latter is disposed right inside the housing groove 20'. The sealing packing further includes a profile seal 26 and a supporting rope seal 27, both made of an elastomer or polymer, preferably of FKM, which is characterized by high thermal and chemical resistance. FKM withstands hydrocarbons such as, e.g., oils and fuels, even at higher temperatures, without swelling or dissolving. Provided between the profile seal 26 and the supporting rope seal 27 on the one hand, and the sealing layer 25 on the other hand, there is a sealing compound 29 which is a mixture of small, fragmented PTFE fibers and/or graphite components, as well as high temperature-resistant synthetic mineral oil grease. At high temperatures, this mixture tends to migrate, i.e., it becomes viscous, but with the more temperature-resistant woven graphite yarn forms an ideal unit for sealing with these more stringent requirements.

Above and below the profile seal 26 a further, preferably metallic sealing bar and scraper 28, preferably made of brass, is respectively provided as part of the sealing packing, supporting rope seals 27 respectively being placed between the sealing bar and scraper 28 and the sealing layer 25.

The lateral seals 21, 22 disposed above and below the sealing packing are once again profile seals made of an elastomer, preferably of FKM or of glass fiber-filled FKM. A supporting rope seal 27 is once again respectively placed in the corresponding housing grooves 21', 22'.

The aforementioned closed hood 15 made of steel, which is preferably welded together from individual parts, and which is placed with its base part 30 onto the structural flange 13 and is screwed to the latter, also contributes to increased fire safety. Provided between the base of the hood 30 and the structural flange 13 there is a flat seal made of woven graphite yarn. A seal made of woven graphite yarn comprising, for example, three rings, is also provided on the drive spindle 11/bevel gear 17 hood passage. Disposed between the closed housing for the bevel gear 17 and the covering part 14 of the hood 15 there is a flat seal, preferably made of a high temperature-resistant and chemically resistance elastomer.

Figure 4:
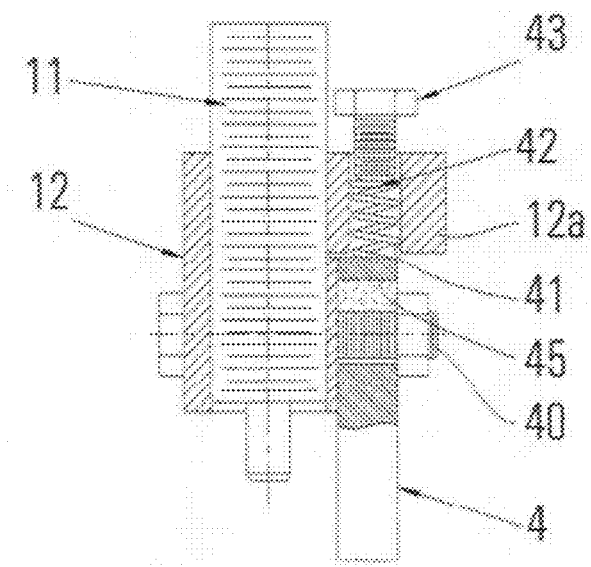
FIG. 4 is a further part of FIG. 2 in an enlarged scale.

FIG. 4 shows in detail the spindle nut 12 operatively connected to the drive spindle 11 and to which the slider plate 4 is attached on the side by means of the connection screws 40 (see also FIG. 1). The spindle nut 12 is provided with an upper projection 12a in the vertical opening 41 of which a spring 42 is disposed which is supported between a positioning screw 43 and the slider plate 4, and acts upon the slider plate 4 from above in the direction of closing. The slider plate 4 has vertically directed slots 45 for the connection screws 40 which are advantageously thermo-mechanically secured, i.e., are filled with a securing glue. Therefore, during the displacement movement the slider plate 4 can not move semi-loosely, and the slots 45 can not fill with any possible dirt. In the event of a fire the thermo-mechanical protection burns away in a controlled manner, and the spring 42 presses the slider plate 4 into the seat.

The invention claimed is:

1. A slide valve, comprising:
    a housing having a passage opening, a flange and grooves on one side of said passage opening;
    a slider plate movable partly within said housing to open and close said passage opening;
    a lateral seal arranged in each of said grooves and each of said lateral seals engaging one side of said slider plate, at least one of said lateral seals being in the form of sealing packing that has an innermost sealing layer made of woven graphite yarn;
    a coating forming a temperature barrier arranged on an inside of said housing, an outside of said housing and said slider plate, said coating comprising a high temperature-resistant layer and a tumescent layer;
    a hood coupled to said flange and having a covering part; and
    a drive mechanism for moving said slider plate to open and close said passage opening, said drive mechanism comprising a drive spindle and a spindle nut coupled to said slider plate, one end region of said drive spindle being rotatably mounted to said flange of said housing and an opposite end region of said drive spindle being mounted on said covering part of said hood.

2. The slide valve according to claim 1, wherein said coating further comprises a polytetrafluoroethylene (PTFE) layer with a low friction coefficient.

3. The slide valve according to claim 2, wherein said PTFE layer comprises a high temperature-resistant mixture of barium sulphates and silicones.

4. The slide valve according to claim 2, wherein said coating comprises an adhesive undercoat in contact with the inside of said housing, the outside of said housing and said slider plate, said high temperature-resistant layer being part of said adhesive undercoat, said PTFE layer being an upper layer of said coating.

5. The slide valve according to claim 4, wherein said adhesive undercoat is chemically resistant, said tumescent coat is a catalytic two-component epoxy layer, and said PTFE layer is a high temperature-resistant mixture of barium sulphates and silicones.

6. The slide valve according to claim 1, wherein said sealing packing further includes a profile seal with a supporting rope seal, a sealing compound between said supporting rope seal and a respective metallic or synthetic sealing bar and a scraper with protective rope seals.

7. The slide valve according to claim 6, wherein said profile seals are made of FKM.

8. The slider valve according to claim 6, further comprising two additional lateral seals arranged in parallel above and below said at least one lateral seal that is in the form of said sealing packing, said additional lateral seals being elastomer profile seals.

9. The slide valve according to claim 8, wherein the additional lateral seals are made of FKM.

10. The slide valve according to claim 1, wherein said high temperature resistant layer is overcoated with catalytic epoxy.

11. The slide valve according to claim 1, further comprising a manually operable drive wheel for rotating said drive spindle via a gear.

12. The slide valve according to claim 11, wherein said gear is situated in a closed gear housing and said closed gear housing is screwed together with said covering part of said hood.

13. The slide valve according to claim 11, further comprising a flat seal made of FKM situated between said closed gear housing and said covering part of said hood.

14. The slide valve according to claim 1, further comprising:
    connection screws that attach said spindle nut to said slider plate, said slider plate including slots through which said connection screws pass; and
    a spring acting on said slider plate in a direction of closing of said slider plate, said spring being partly situated in a projection of said spindle nut.

15. The slide valve according to claim 14, wherein said slots are secured thermo-mechanically and are filled with a securing glue.

16. The slide valve according to claim 14, wherein said spindle nut is attached to a side of said slider plate by said connection screws, said slots being vertically directed slots, said spring acting on said slider plate from above.

17. The slide valve according to claim 1, wherein said hood is a closed hood.

18. The slide valve according to claim 1, wherein said slider plate is configured to move in a direction perpendicular to an axis of said passage opening.

19. The slide valve according to claim 1, wherein said grooves are arranged in said housing perpendicular to a direction of displacement of said slider plate.

20. The slide valve according to claim 1, wherein said housing includes three grooves on each side of said slider plate.

* * * * *